US006896240B2

(12) United States Patent
Wijaya

(10) Patent No.: US 6,896,240 B2

(45) Date of Patent: May 24, 2005

(54) DIAPHRAGMED AIR VALVE SYSTEM

(76) Inventor: Heru Prasanta Wijaya, Graha Famili D. 183, Pr. Kali Kendal, Surabaya (ID), 60226

( * ) Notice: Subject to any disclaimer, the term of this patent is extended or adjusted under 35 U.S.C. 154(b) by 0 days.

(21) Appl. No.: 10/304,726

(22) Filed: Nov. 25, 2002

(65) Prior Publication Data

US 2003/0127618 A1 Jul. 10, 2003

Related U.S. Application Data

(63) Continuation-in-part of application No. PCT/IB00/01096, filed on Aug. 8, 2000.

(51) Int. Cl.[7] .................................................. F16K 3/03

(52) U.S. Cl. ....................................................... 251/212

(58) Field of Search .......................................... 251/212

(56) References Cited

U.S. PATENT DOCUMENTS

| | | | | |
|---|---|---|---|---|
| 2,725,075 A | | 11/1955 | Irgens | |
| 3,895,646 A | | 7/1975 | Howat | |
| 4,094,492 A | * | 6/1978 | Beeman et al. | 251/212 |
| 4,122,668 A | * | 10/1978 | Chou et al. | 251/212 |
| 4,232,595 A | * | 11/1980 | Cox | 251/212 |
| 4,458,876 A | * | 7/1984 | Schaeper et al. | 251/212 |
| 5,749,342 A | * | 5/1998 | Chao | 123/184.56 |
| 5,799,927 A | * | 9/1998 | Geist | 251/212 |
| 5,819,540 A | * | 10/1998 | Massarani | 251/212 |
| 6,375,155 B1 | * | 4/2002 | Janssens | 251/212 |

FOREIGN PATENT DOCUMENTS

| | | |
|---|---|---|
| GB | 426297 | 6/1934 |
| WO | WO 95/19496 | 7/1995 |
| WO | WO 98/10187 | 3/1998 |
| WO | WO 98/17907 | 4/1998 |

OTHER PUBLICATIONS

International Search Report of PCT/IB00/01096, dated Jan. 25, 2001.

* cited by examiner

*Primary Examiner*—Paul J. Hirsch
(74) *Attorney, Agent, or Firm*—Christie, Parker and Hale, LLP

(57) ABSTRACT

A diaphragmed air valve system for an automotive engine is provided which is designed for the purpose of keeping intact the shape as well as the mass of an air flow going through it. This diaphragmed air valve system includes a cylindrical air inlet having a valve opening covered by a number of plates of specific type and arrangement. The rate of air flowing into the engine is dictated by the diameter of the valve opening defined by the specific arrangement and type of the plates.

6 Claims, 3 Drawing Sheets

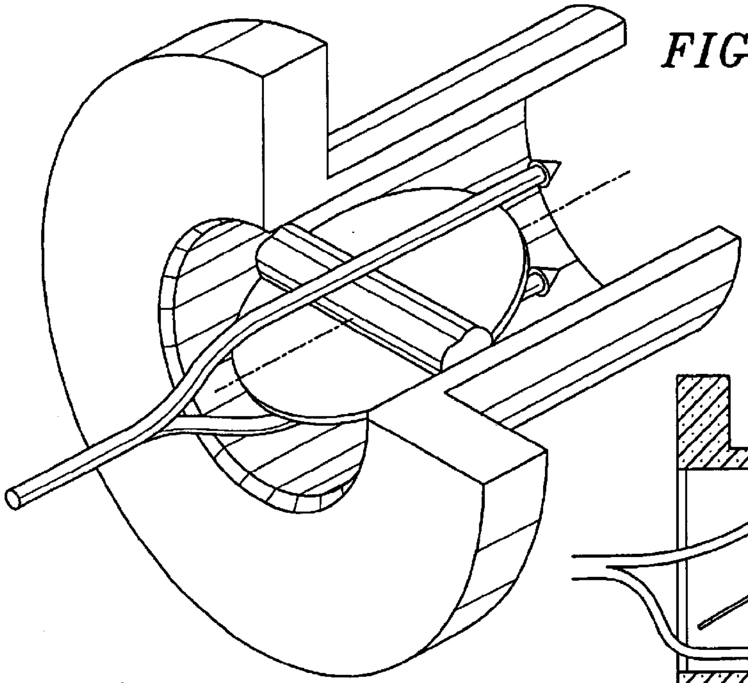
FIG. 3a
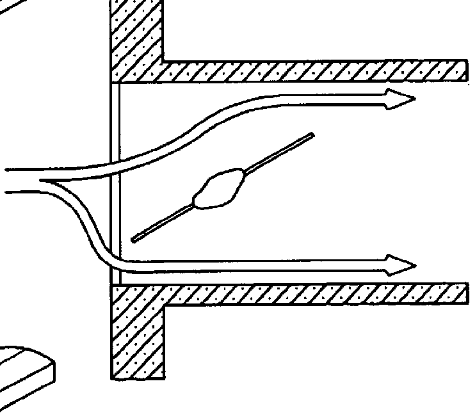
FIG. 3c
FIG. 3b
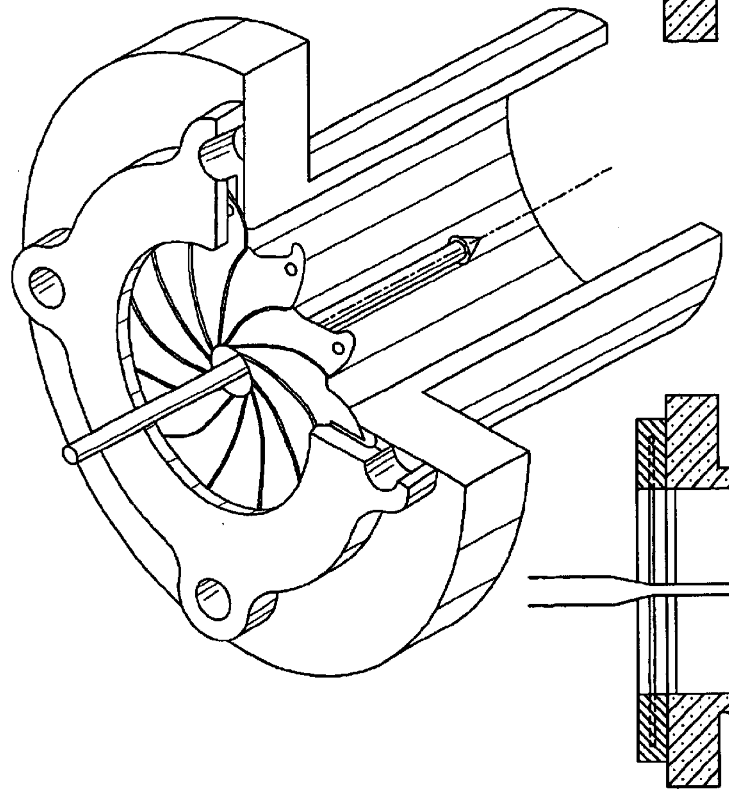
FIG. 3d
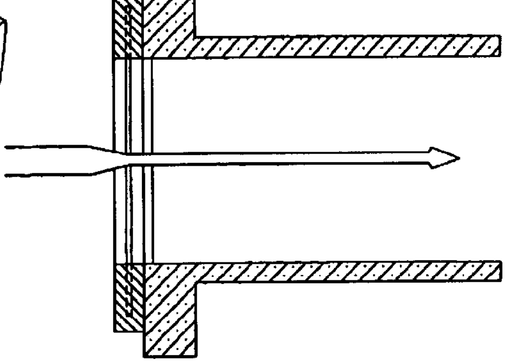

SECTION "X"-"X"

DIAPHRAGMED AIR VALVE SYSTEM

CROSS-REFERENCE TO RELATED APPLICATION

This application is a continuation-in-part of International Application No. PCT/IB00/01096, filed on Aug. 8, 2000, which claims priority of Indonesian patent application No. S20000089, filed on May 23, 2000.

FIELD OF INVENTION

This invention relates to a diaphragmed air valve system used to set the air entering an internal combustion engine in such a way so that the shape as well as the mass of the air is kept intact before and after entering the engine.

BACKGROUND OF INVENTION

Automotive technology needs an engine of sound performance and handling. Car speed can be easily set if the fuel within the engine is entirely combusted. Numerous ways have been so far developed to manage the fuel combustion within the engine. Of them, the most common way is to efficiently manage the air entering the combustion chamber.

Rate of air supplied into the engine is regulated by an air valve whose area of opening outside the engine can be set. In valves of current use, an intact air body is generally broken into two separated bodies once it enters the engine. To make the shape as well as the mass of the air body unchanged, we need a valve whose opening always lies in the center of the streamline. Opening of this type can be established only by means of diaphragm system.

SUMMARY OF THE INVENTION

A diaphragmed air valve system on automotive engines is designed for the purpose of regulating air supplied into the engine in such a way so that the shape as well as the mass of the air body is unchanged before and after entering the engine. An example of air valve of current use is shown in FIG. 1. This air valve, comprises a cylindrical inlet (1*a*) and having a circular opening (1*b*) and a flap (1*c*) that is rotatable along the axis (1*d*) perpendicular to circular cross-section of the opening. Rate of air flowing into the engine is absolutely dictated by the angle through which the valve opening is opened.

Basic construction of the diaphragmed air valve system presently invented is shown in FIG. 2. This diaphragmed air valve comprises a cylindrical inlet (2*a*) and a valve opening (2*b*) constituted by a number of small plates of specific type(2*c*) and arrangement. When opened, the valve opening forms openings in the center of the streamline. The rate of air flowing into the engine is controlled by the valve diameter formed due to the specific type and arrangement of the small plates (2*c*) constituting the valve opening.

This diaphragmed air valve system is attached after the air inlet of the air filter and carburetor or intake manifold on an automotive engine that uses injection system.

BRIEF DESCRIPTION OF THE DRAWINGS

FIG. 3*a* is the separation or branching into two bodies of the initial intact air body within a cylindrical air valve, FIG. 3*c* is a side view of same.

FIG. 3*b* is an intact air flow produced by the diaphragmed air valve system presently invented, FIG. 3*d* is a side view of same.

DETAILED DESCRIPTION OF THE INVENTION

Figure 1:
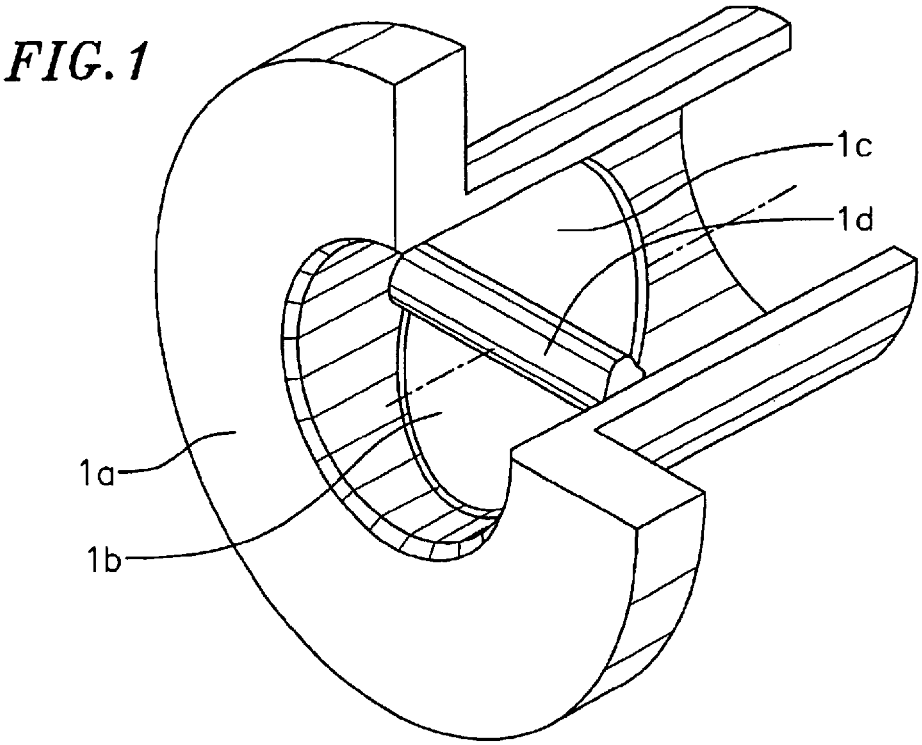
FIG. 1 is an air valve comprising a cylindrical inlet (1*a*) and a circular opening (1*b*) which is of current use in automotive engines.

One way of handling the rotation of an automotive engine is to regulate the air supplied into the engine by using a valve attached on the air inlet of the engine. An example of an air valve of current use in automotive engines is shown in FIG. 1. The air valve comprising a cylindrical inlet (1*a*) having a circular opening (1*b*) and a flap (1*c*) which is rotatable along the axis (1*d*) perpendicular to circular cross-section of the opening. Rate of air flowing into the engine is absolutely dictated by the angle through which the valve opening is opened.

Owing to the shape of the air valve of current use (FIG. 1), the air passing through it will always be broken into two separated flows (FIG. 3*a*). Due to losses, the mass of air flowing into the engine is greatly reduced.

The diaphragmed air valve system of the present invention is designed for the purpose of setting the air flow in such a way so that the shape as well as the mass of air before and after entering the engine is kept intact.

Figure 2A:
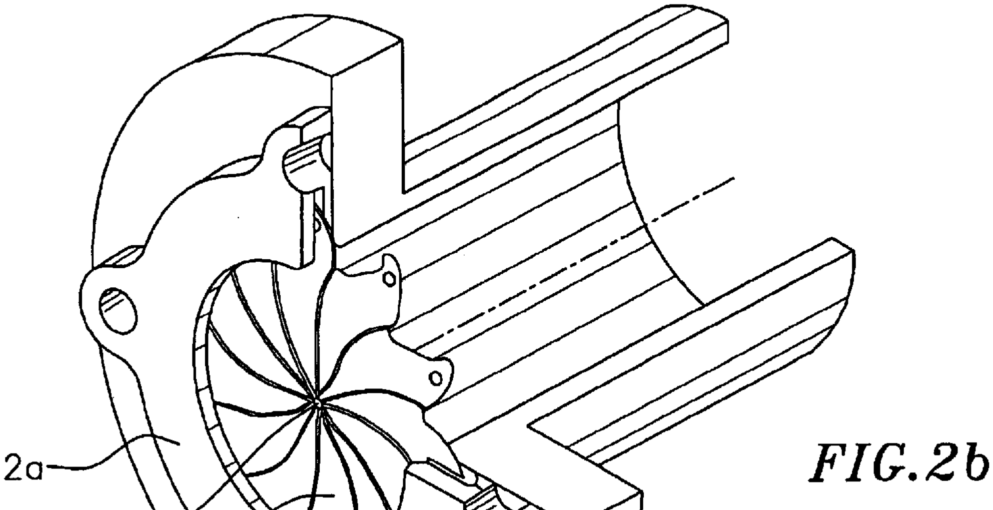
FIG. 2*a* is a diaphragmed air valve system comprising a cylindrical inlet (2*a*) and a valve opening (2*b*) constituted by a number of small plates (2*c*) whose type and pattern of arrangement control the area of the valve opening.
Figure 2B:
FIG. 2*b* is an examplary shape of a plate.

Basic construction of the diaphragmed air valve system presently invented is shown in FIG. 2. This diaphragmed air valve comprises a cylindrical inlet (2*a*) and a valve opening (2*b*) constituted by a number of small plates of specific type (2*c*) and arrangement which forms openings in the center of the streamline when the valve is opened. The rate of air flowing into the engine is dictated by the valve diameter formed by the arrangement of the small plates (2*c*) constituting the valve opening.

Figure 4A:
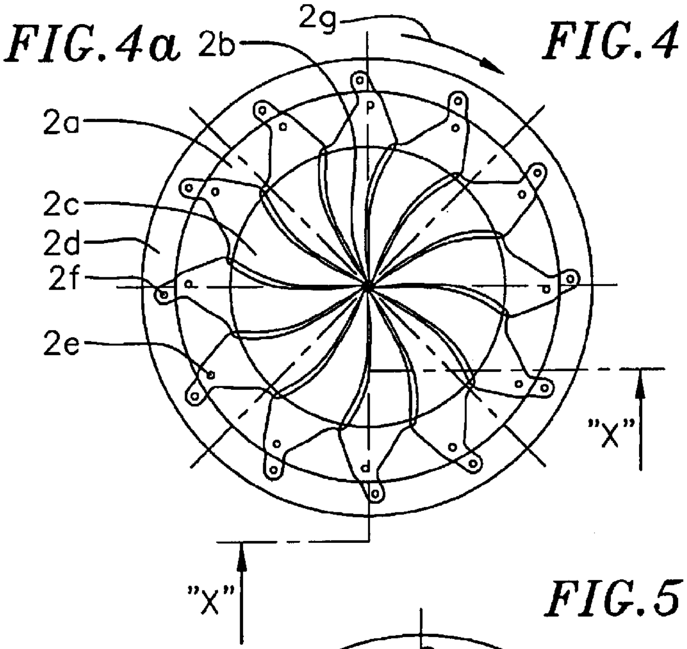
FIG. 4*a* is a two dimensional view of an embodiment of a diaphragmed air valve where the opening thereof is in a closed position.
Figure 4B:
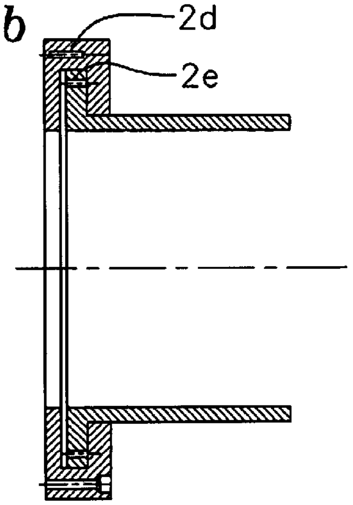
FIG. 4*b* is a side view of same.
Figure 5A:
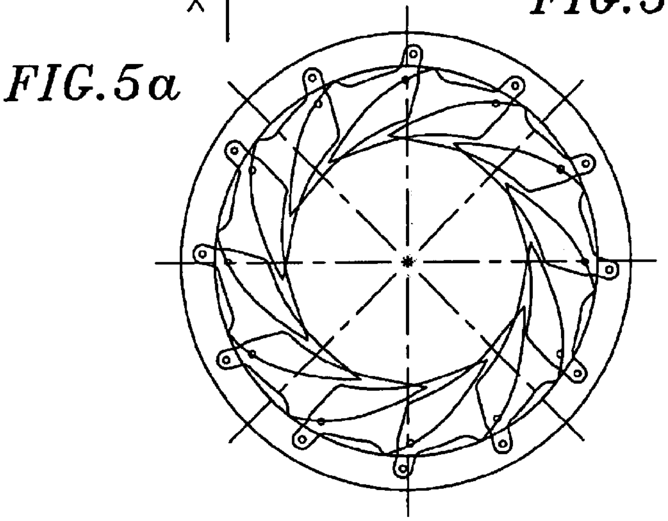
FIG. 5*a* is a two dimensional view of an embodiment of a diaphragmed air valve where the opening thereof, is in a open position.
Figure 5B:
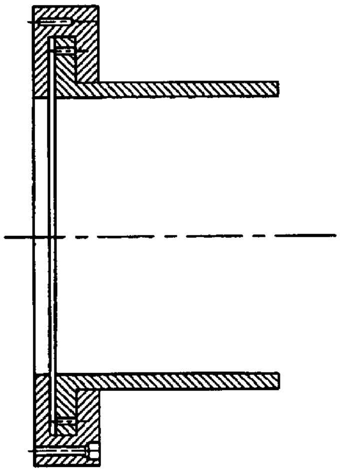
FIG. 5*b* is a side view of same.
Figure 6:
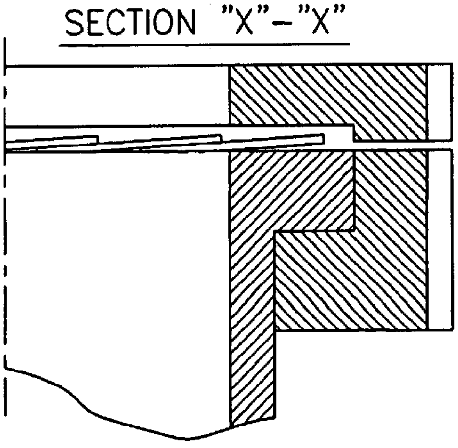
FIG. 6 is a two dimensional-sectional view along X—X in FIG. 4.

FIGS. 4 and 5 shows the embodiment of this diaphragmed air valve system in two dimensions. In FIG. 4, the valve opening (2*b*) is in a closed position. The valve opening (2*b*) can be opened by turning ring (2*d*) with respect to ring (2*a*) in the direction of arrow 2*g*. Due to the existence of a fixed tightening pin (2*e*) on ring (2*a*) about which a diaphragm-constituting plate (2*c*) can pivot, and a fixed tightening pin (2*f*) on ring (2*d*) about which the diaphragm-constituting plate (2*c*) can pivot, the position of the diaphragm-constituting plate (2*c*) will change to form a valve opening (2*b*). In FIG. 6, the diaphragmed air valve opening (2*b*) is in an opened position.

The arrangement of diaphragm plates (2*c*) can be seen clearly in FIG. 6, which is a side view of line X—X in FIG. 6. The diaphragm plates (2*c*) are arranged in an overlapping manner one over another. The amount of these diaphragm plates (2*c*) will determine the shape of the valve opening (2*b*), i.e., a polygon. At least 3 pieces of diaphragm plates (2*c*) are needed to form a diaphragmed air valve system.

The position of this air valve in an internal combustion engine is after the air inlet of the air filter and carburetor if such internal combustion engine uses a carburetor in its fuel-supplying system. On the other hand, if the internal combustion engine uses a fuel injection system, the air valve is located after the air inlet of the air filter and intake manifold of the engine.

The description and drawings disclosed are intended merely as illustration, not as limitation. Modifications are always possible for the people skilled in the art as long as they are still within the scope of the invention and claims.

What is claimed is:

1. A diaphragmed valve system for controlling airflow to an automotive engine intake comprising:

a cylindrical air inlet comprising a valve opening for receiving an airflow; and a plurality of plates of specific type and aerodynamic arrangement forming a diaphragm, said plurality of plates pivotable between a first position covering the valve opening blocking airflow to the valve opening and a second position providing access to a center portion of the valve opening and allowing an airflow streamline through the center portion of the valve opening, wherein the airflow rate to the engine is controlled by the size of the opening defined by the plurality of plates, and wherein the airflow through the valve remains intact.

2. The valve system of claim 1 further comprising a first ring and a second ring, wherein each of the plurality of plates is pivotally coupled to the first ring and is pivotally coupled to the second ring, wherein rotation of the first ring relative to the second ring in a first direction causes the plates to move to the first position and rotation of the first ring relative to the second ring in a second direction opposite the first direction causes the plates to move to the second position.

3. A valve and engine combination comprising:

an engine comprising an intake;

a valve controlling airflow into the intake, the valve comprising, a cylindrical air inlet comprising a valve opening for receiving an airflow, and a plurality of plates of specific type and aerodynamic arrangement forming a diaphragm, said plurality of plates pivotable between a first position covering the valve opening blocking airflow to the valve opening and a second position defining an opening providing access to a center portion of the valve opening and allowing an airflow streamline through the center portion of the valve opening, wherein the airflow rate to the engine is controlled by the size of the opening defined by the plurality of plates, and wherein the airflow through the valve remains intact.

4. The combination of claim 3 wherein the valve further comprises a first ring and a second ring, wherein each of the plurality of plates is pivotally coupled to the first ring and is pivotally coupled to the second ring, wherein rotation of the first ring relative to the second ring in a first direction causes the plates to move to the first position and rotation of the first ring relative to the second ring in a second direction opposite the first direction causes the plates to move to the second position.

5. A diaphragmed valve system for controlling airflow to an automotive engine intake comprising:

a cylindrical air inlet comprising a valve opening for receiving an airflow;

a first ring and a second ring; and a plurality of plates of specific type and aerodynamic arrangement forming a diaphragm, each of the plurality of plates is pivotally coupled to the first ring and is pivotally coupled to the second ring, wherein rotation of the first ring relative to the second ring in a first direction causes the plates to move to a first position restricting airflow to the valve opening and rotation of the first ring relative to the second ring in a second direction opposite the first direction causes the plates to move to a second position allowing an airflow streamline through the valve opening.

6. A valve and engine combination comprising:

an engine comprising an intake;

a valve controlling airflow into the intake, the valve comprising, a cylindrical air inlet comprising a valve opening for receiving an airflow, a first ring and a second ring, and a plurality of plates of specific type and aerodynamic arrangement forming a diaphragm, each of the plurality of plates is pivotally coupled to the first ring and is pivotally coupled to the second ring, wherein rotation of the first ring relative to the second ring in a first direction causes the plates to move to a first position restricting airflow to the valve opening and rotation of the first ring relative to the second ring in a second direction opposite the first direction causes the plates to move to a second position allowing an airflow streamline through the valve opening.

* * * * *

UNITED STATES PATENT AND TRADEMARK OFFICE

CERTIFICATE OF CORRECTION

PATENT NO. : 6,896,240 B2
APPLICATION NO. : 10/304726
DATED : May 24, 2005
INVENTOR(S) : Wijaya It is certified that error appears in the above-identified patent and that said Letters Patent is hereby corrected as shown below:

On the Title Page

| | |
|---|---|
| Item (30) Foreign Application Priority Data | Insert --(30) **Foreign Application Priority Data** May 23, 2000 (ID) ............ S20000089-- |
| Item (56) References Cited OTHER PUBLICATIONS | Insert --International Preliminary Examination Report of PCT/IB00/01096, dated Aug. 9, 2002-- |
| Column 1, line 42 | Delete “valve,”, Insert --valve-- |
| Column 1, line 43 | Delete “having”, Insert --has-- |
| Column 2, line 1 | Delete “examplary”, Insert --exemplary-- |
| Column 2, line 3 | Delete “,”, Insert --;-- |
| Column 2, line 6 | Delete “,”, Insert --;-- |
| Column 2, line 10 | Delete “,”, Insert --;-- |
| Column 2, line 12 | Delete “thereof, is in a”, Insert --thereof is in an-- |
| Column 2, line 13 | Delete “,”, Insert --;-- |

UNITED STATES PATENT AND TRADEMARK OFFICE

CERTIFICATE OF CORRECTION

PATENT NO. : 6,896,240 B2
APPLICATION NO. : 10/304726
DATED : May 24, 2005
INVENTOR(S) : Wijaya It is certified that error appears in the above-identified patent and that said Letters Patent is hereby corrected as shown below:

Column 2, line 14 Delete “two dimensional-section”, Insert --two-dimensional section--

Signed and Sealed this

Twenty-third Day of October, 2007

JON W. DUDAS
*Director of the United States Patent and Trademark Office*